United States Patent
Goo et al.

(10) Patent No.: US 7,450,562 B2
(45) Date of Patent: Nov. 11, 2008

(54) METHOD FOR TRANSMITTING SHORT MESSAGE USING INTERNET PHONES AND SYSTEM THEREFOR

(75) Inventors: Bon-Seuk Goo, Seoul (KR); Kyoung-Hoon Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 858 days.

(21) Appl. No.: 10/087,777

(22) Filed: Mar. 5, 2002

(65) Prior Publication Data

US 2003/0046328 A1    Mar. 6, 2003

(30) Foreign Application Priority Data

Sep. 5, 2001    (KR)    ............................ 2001-54383

(51) Int. Cl.
*H04L 12/66* (2006.01)
*H04Q 7/00* (2006.01)
*H04M 1/64* (2006.01)
*G06F 15/16* (2006.01)

(52) U.S. Cl. .................. 370/352; 370/328; 370/331; 379/88.17; 709/200

(58) Field of Classification Search ......... 370/310–352, 370/401–437, 466–469; 709/200–238, 245–249; 455/427–445, 461–466, 514–518; 379/88–98
See application file for complete search history.

(56) References Cited

U.S. PATENT DOCUMENTS

| | | | | |
|---|---|---|---|---|
| 6,067,529 | A * | 5/2000 | Ray et al. ...................... | 705/26 |
| 6,321,257 | B1 * | 11/2001 | Kotola et al. .................. | 709/219 |
| 6,487,602 | B1 * | 11/2002 | Thakker ........................ | 709/230 |
| 6,512,926 | B1 * | 1/2003 | Henry-Labordere ......... | 455/445 |
| 6,611,516 | B1 * | 8/2003 | Pirkola et al. ................ | 370/352 |
| 6,788,660 | B1 * | 9/2004 | Agrawal et al. .............. | 370/331 |
| 6,891,811 | B1 * | 5/2005 | Smith et al. .................. | 370/310 |

(Continued)

OTHER PUBLICATIONS

*Communication* issued by European Patent Office dated on Mar. 1, 2004 corresponding European Patent Application No. EP 02 00 8765.

(Continued)

*Primary Examiner*—M. Phan
(74) *Attorney, Agent, or Firm*—Robert E. Bushnell, Esq

(57) ABSTRACT

A method and system for transmitting a short message to a called party's Internet phone use an Internet phone according to the H.323 multimedia communication protocol. The invention provides a message transmission system between a short message transmission server and a gatekeeper. The gatekeeper controls setup of a call and user registration or cancellation in the Internet phone. The Internet phone is optionally connected to the gatekeeper, and has a short message transmission module for transmitting, via a predetermined port, the short message including information corresponding to a telephone number of the called party's Internet phone. The short message transmission server serves as an H.323 terminal registered in the gatekeeper, and is constructed to transmit, to the gatekeeper, the information relating to the called party's Internet phone incorporated in the corresponding short message so as to obtain an Internet protocol (IP) address of the called party's Internet phone, and to transmit the short message to the IP address of the called party's Internet phone. The invention allows a user of the Internet phone to transmit the SMS message to the called party's Internet phone using the registration admission and status (RAS) protocol of the H.323 multimedia communication protocol.

14 Claims, 5 Drawing Sheets

U.S. PATENT DOCUMENTS

| | | | |
|---|---|---|---|
| 6,947,738 B2* | 9/2005 | Skog et al. | 455/426.1 |
| 7,058,423 B1* | 6/2006 | Ahmavaara | 455/552.1 |
| 2002/0124057 A1* | 9/2002 | Besprosvan | 709/219 |
| 2002/0159387 A1* | 10/2002 | Allison et al. | 370/229 |
| 2002/0181672 A1* | 12/2002 | Cannell et al. | 379/88.14 |
| 2003/0018806 A1* | 1/2003 | Rueger et al. | 709/238 |
| 2003/0036396 A1* | 2/2003 | Back et al. | 455/466 |
| 2003/0043762 A1* | 3/2003 | Pang et al. | 370/328 |
| 2003/0083078 A1* | 5/2003 | Allison et al. | 455/466 |
| 2004/0029598 A1* | 2/2004 | Guggisberg | 455/466 |
| 2004/0053629 A1* | 3/2004 | Rueger et al. | 455/466 |
| 2004/0057561 A1* | 3/2004 | Gilbert | 379/88.14 |
| 2004/0110516 A1* | 6/2004 | Miralles et al. | 455/466 |
| 2005/0282565 A1* | 12/2005 | Shaheen | 455/466 |

OTHER PUBLICATIONS

XP-002270199 "*Annex-E- Mapping of Mobile Application Part (MAP) to H.225.0 in order to extend the current wireless mobile services to H.323 network users*" issued by Intel Corporation on Feb. 2000.

* cited by examiner

METHOD FOR TRANSMITTING SHORT MESSAGE USING INTERNET PHONES AND SYSTEM THEREFOR

CLAIM OF PRIORITY

This application claims priority to an application entitled METHOD FOR TRANSMITTING SHORT MESSAGES USING INTERNET PHONES AND A SHORT MESSAGE TRANSMISSION SYSTEM filed in the Korean Industrial Property Office on Sep. 5, 2001 and assigned the Serial No. 2001-54383, the contents of which are hereby incorporated by reference.

BACKGROUND OF THE INVENTION

1. Technical Field

The present invention relates generally to a digital communication system for wireless mobile communication terminals based on the H.323 protocol system and, in particular, to a method and system for transmitting a set of short messages, as well as voice communications, between Internet phones using the H.323 protocol system.

2. Related Arts

Telephone networks generally allow wired or wireless subscribers to make voice communications with each other, while data communication networks allow the subscriber to perform various data or information transmissions, as well as voice communications. Further, so-called Internet phones capable of making domestic or international telephone calls via the Internet on data communication networks have been recently in wider use due to their much more economical telephone charges (in particular, in relation to any international calls) compared to charges incurred in using regular telephones.

The H.323 protocol recommended by ITU-T (International Telecommunication Union-Telecommunication Standard Sector) prescribes standards for digital multimedia based communications between wireless terminals, e.g., Internet phones on a packet based network such as the Internet. This protocol may be referred to as "Voice over Internet Protocol (VoIP)" service in the art. The H.323 system is configured to prescribe the entire communications protocol between a variety of network entities substantially constituting one fixed network for multimedia based communications involving the transfer of images as well as voice information, which entities may include Internet phones, a gateway, a multipoint control unit (MCU) as a terminal, and/or a gatekeeper for performing call admission or address translation.

An H.323 multimedia communication network comprises at least one gatekeeper for generally controlling the H.323 system and a plurality of H.323 terminal equipments, such as a personal computer or an Internet phone optionally connected, via a packet based network, to the gatekeeper. The gatekeeper serves substantially to provide overall control of all operations of the H.323 system, including setting up and management of incoming/outgoing calls, and any other additional services, such as multi-party calling, call forwarding or various call termination services available using the system, in particular, in association with the H.323 terminals and a gateway. For the purpose of effecting digital communications between those Internet phones, the H.323 protocol system generally prescribes a series of authentication messages required to communicate between the Internet phone and the gatekeeper.

In order for an Internet phone of a calling party to make a call to an Internet phone of a called party, the Internet phone of the calling party transmits a call admission request message to the gatekeeper, and the Internet phone of the calling party also provides an address of the Internet phone of the called party, i.e., a telephone number of the called party. Thereafter, in reply, the gatekeeper transmits a call admission confirmation message to the calling party when the gatekeeper retrieves a corresponding Internet protocol (IP) address of the called party after searching through a list of IP address registrations, and then sends back the retrieved IP address to the calling party. Then, the Internet phone of the calling party transmits a call setup message to the Internet phone of the called party using this IP address of the called party. The Internet phone of the called party receiving the call setup message sends back a call admission request message to the gatekeeper, and the gatekeeper sends back an admission confirm message to the Internet phone of the called party in response. Then, the Internet phone of the called party receiving the admission confirm message transmits a call connect message to the Internet phone of the calling party. Subsequently, media channel signaling is carried out to establish a communication channel between the Internet phones of the calling party and the called party, and then speech between the two Internet phones is performed.

In the meantime, a short message service (SMS) conveniently utilized to transmit a relatively short message from a calling party to a called party using a mobile terminal is commonly employed in a cellular communication system. Most users accustomed to this SMS function would prefer to use such a short message service in their Internet phones, allowing them to enter and transmit any short messages to an intended called party as necessary. However, with regard to the Internet phones, there is no prescribed protocol for communication of such a short message service via its own network connection, although the Internet phones allow not only voice communication but also video telephone calling.

SUMMARY OF THE INVENTION

It is, therefore, an object of the present invention to provide a method and system for transmitting a short message service (SMS) message to a called party's Internet phone, using a registration admission and status (RAS) protocol defined by the H.323 multimedia communication protocol.

To achieve the above and other objects, the present invention provides a system for transmitting a short message in an Internet phone, the system comprising: a gatekeeper for controlling setting up of a call and user registration or cancellation in the Internet phone; an Internet phone optionally connected with said gatekeeper, the Internet phone having a short message transmission module for transmitting the short message via a predetermined port, the short message including information corresponding to a telephone number of a called party's Internet phone; and a short message transmission server serving as a terminal registered in the gatekeeper for transmitting, to the gatekeeper, information relating to the called party's Internet phone incorporated in the corresponding short message when the short message is inputted through the predetermined port so as to obtain an Internet protocol (IP) address of the called party's Internet phone, and for transmitting the short message to the IP address of the called party's Internet phone.

Preferably, in the system, the short message transmission server transmits an admission request (ARQ) message of the registration admission and status (RAS) protocol to the gatekeeper with the telephone number of the called party's Internet phone included in the short message, and then receives an admission confirm (ACF) message to obtain therefrom the Internet protocol (IP) address of the called party's Internet phone.

More preferably, the short message may include a tag portion, the telephone number of the calling party's Internet phone, the telephone number of the called party's Internet phone, and information regarding the length of a main sentence of the short message.

According to another aspect of the invention, there is provided a method for transmitting a short message in an Internet phone, comprising the steps of: transmitting the short message, including a telephone number of a called party's Internet phone, from a calling party's Internet phone to a short message transmission server; transmitting a call admission request message to the gatekeeper with the telephone number of the called party's Internet phone included in the transmitted short message; receiving a call admission confirm message, including an Internet protocol (IP) address of the called party's Internet phone, from the gatekeeper; and transmitting the corresponding short message from the short message transmission server to the Internet protocol (IP) address of the called party's Internet phone.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is configured in such a way that an Internet phone according to the H.323 protocol transmits a short message to a short message transmission server, and then the short message transmission server transmits the short message to a called party's Internet phone. To this end, the present invention provides a method for message transmission between the short message transmission server and the Internet phone and a gatekeeper. The short message transmission server serves as an H.323 terminal registered in the gatekeeper on the H.323 network to obtain an IP address of the called party. Further, it is to be appreciated that the short messages according to the present invention are transferred using a user datagram protocol (UDP) or a transmission control protocol (TCP) of the transmission control protocol/internet protocol (TCP/IP), and an Internet phone and an SMS server employ respective predetermined ports.

Figure 1:
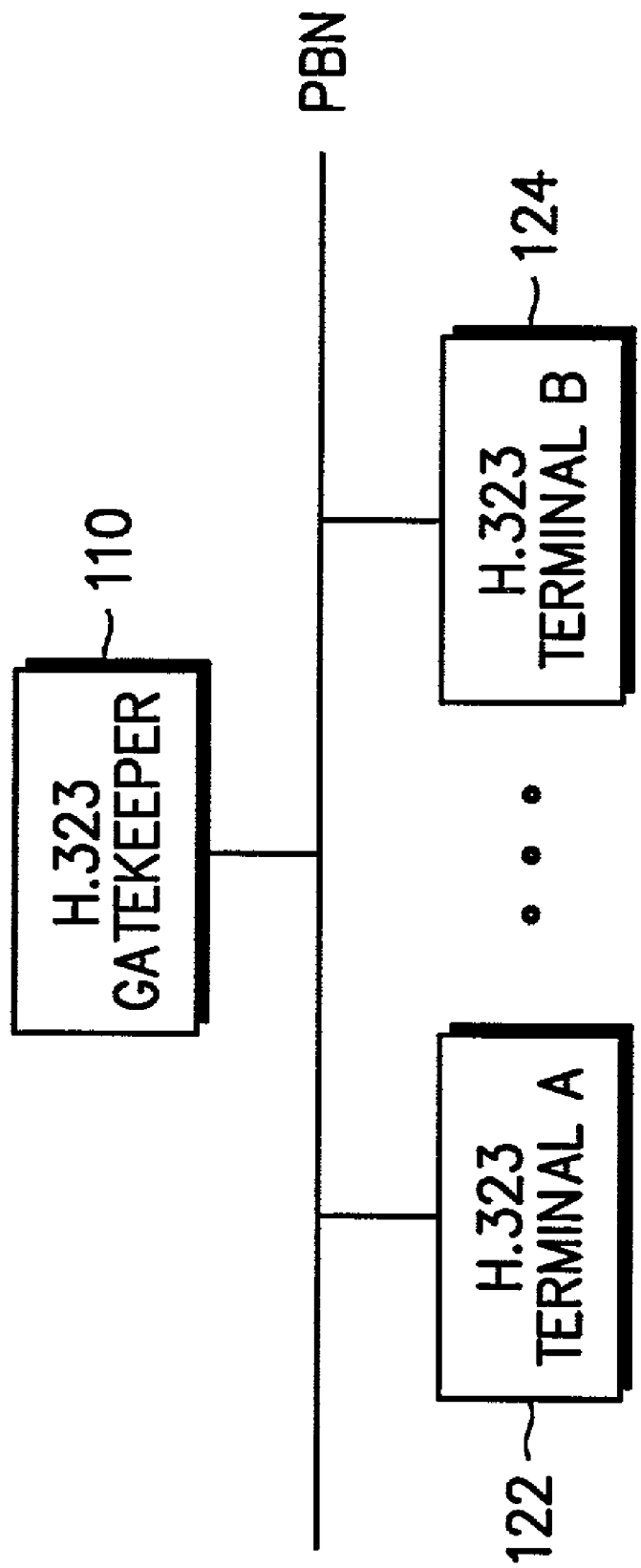
FIG. 1 is a schematic block diagram showing a configuration of an H.323 multimedia communication network.

FIG. 1 shows a schematic diagram for the structure of an H.323 multimedia communication network, comprising at least one gatekeeper 110 for generally controlling the H.323 system, and a plurality of H.323 terminal equipments 122 to 124, such as a personal computer or an Internet phone optionally connected, via a packet based network, to the gatekeeper 110. The gatekeeper 110 serves substantially to provide overall control of the operations of the H.323 system, including setting up and management of an incoming/outgoing call, and any other additional services, such as multi-party calling, call forwarding or various call termination services available using the system, in particular, in association with the H.323 terminals 122 to 124 and a gateway (not shown). For the purpose of effecting digital communications between those Internet phones, the H.323 protocol system generally prescribes a series of authentification messages required to communicate between the Internet phone and the gatekeeper, as set forth in FIG. 2.

Figure 2:
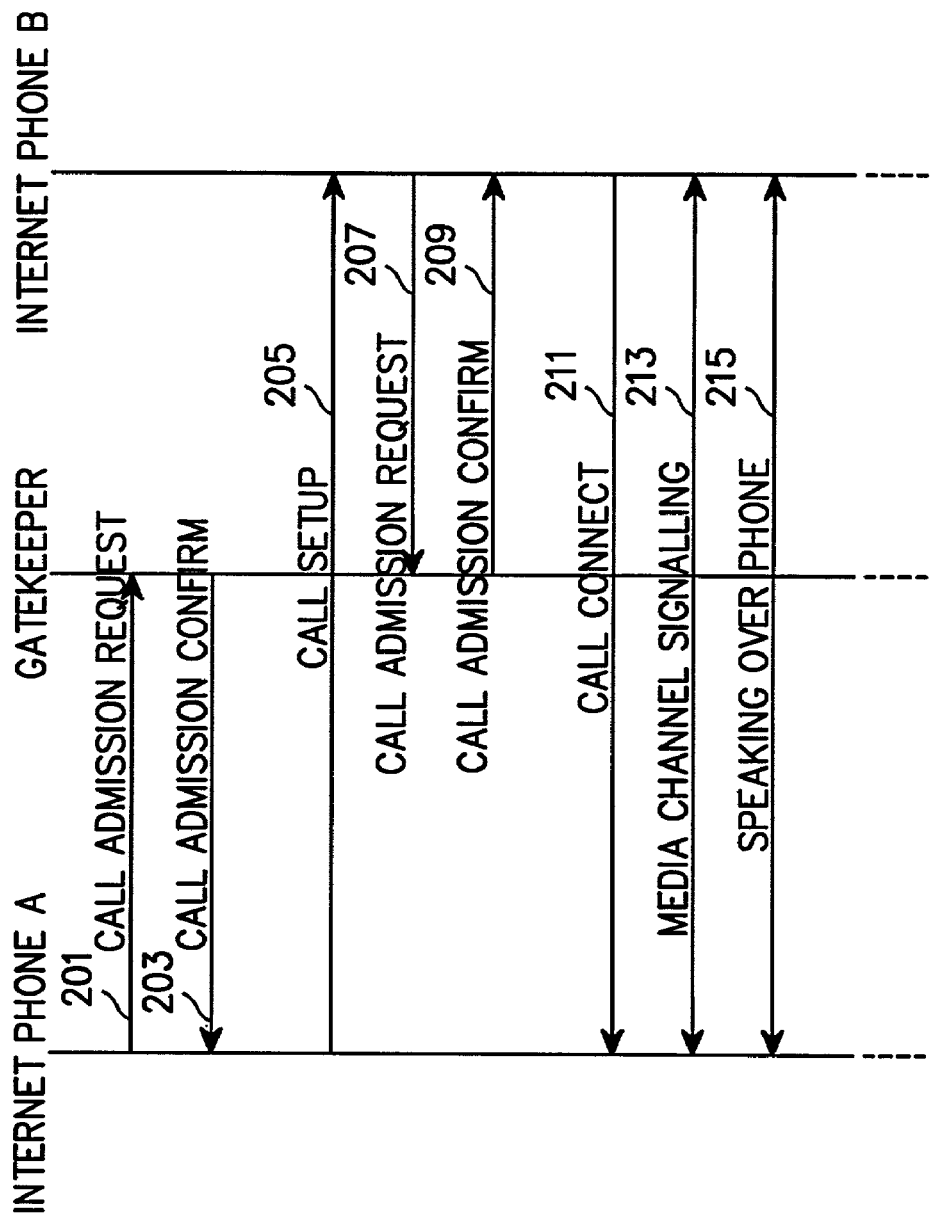
FIG. 2 is a flowchart of the registration admission and status (RAS) message protocol for initiating a telephone call between Internet phones.

FIG. 2 is a flowchart of the registration admission and status (RAS) message protocol for initiating a call between the Internet phones. According to the flowchart of FIG. 2 in order for an Internet phone A (calling party) to make a call to an Internet phone B (called party), the Internet phone A transmits a call admission request message to the gatekeeper in step 201, and the Internet phone A also provides an address of the Internet phone B, i.e., a telephone number of the called party. Thereafter, in reply in step 203, the gatekeeper transmits a call admission confirmation message to the Internet phone A after the gatekeeper retrieves a corresponding Internet protocol (IP) address of the called party by searching a list of IP address registrations, and sends back the retrieved IP address to the calling party. Then, the Internet phone A transmits a call setup message to the Internet phone B using this IP address of the called party in step 205. The Internet phone B receiving the call setup message sends back a call admission request message to the gatekeeper in step 207, while the gatekeeper sends back an admission confirm message to the Internet phone B in response in step 209. Then, the Internet phone B receiving the admission confirm message transmits a call connect message to the Internet phone A in step 211. Subsequently, in step 213, media channel signaling is carried out to establish a communication channel between the Internet phones A and B and then, in step 215, speech between the two Internet phones is performed.

Figure 3:
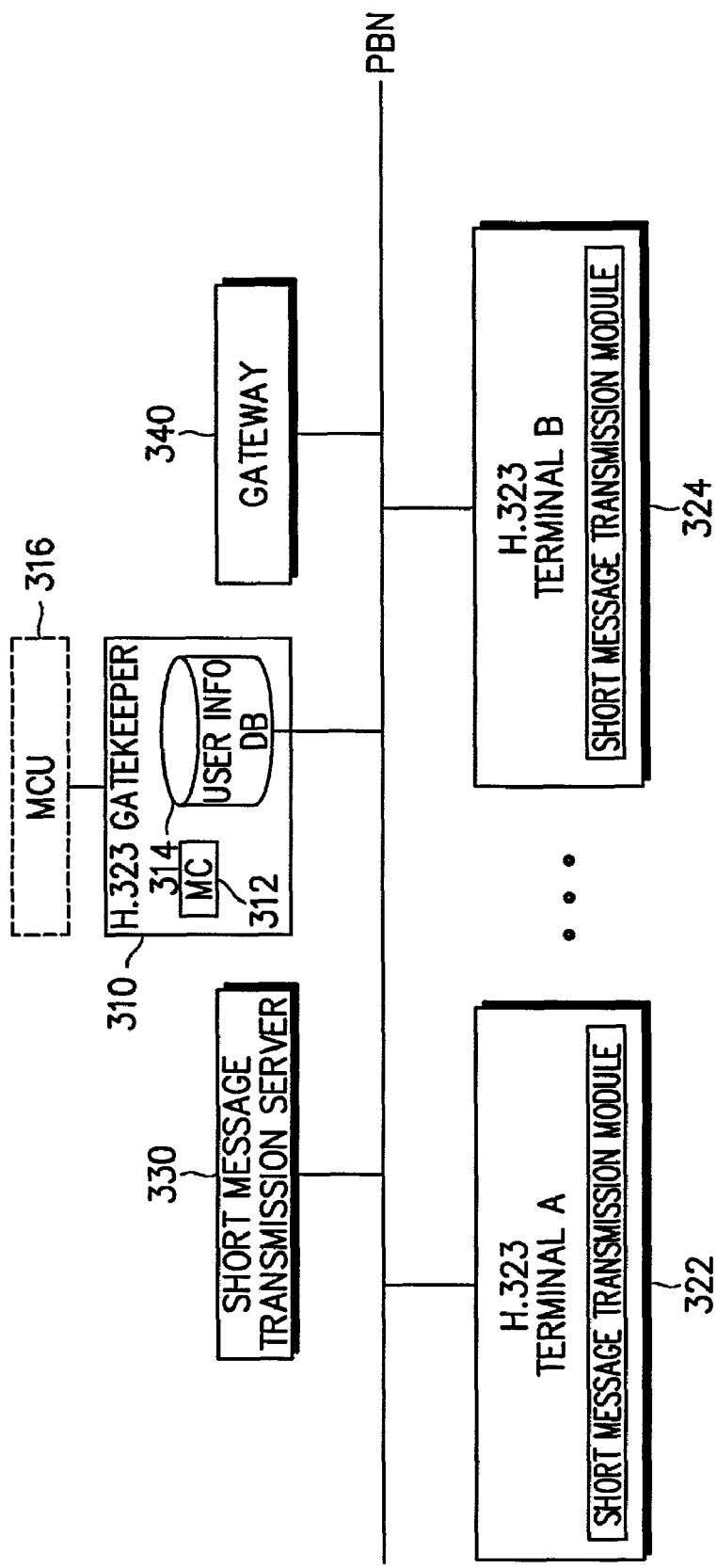
FIG. 3 is a schematic block diagram showing the configuration of an H.323 multimedia communication network for transmission of the short messages service (SMS) data according to a preferred embodiment of the present invention.

FIG. 3 schematically shows the configuration of an H.323 multimedia communication network for transmission of the short messages service (SMS) data according to a preferred embodiment of the present invention. Referring to FIG. 3, the H.323 multimedia network system according to the invention includes: a gatekeeper 310 for generally controlling the H.323 system; two or more terminals 322 to 324 optionally connectable to the gatekeeper 310, the terminals 322 to 324 including, for example, personal computers or Internet phones having therein an SMS transmission module for transmitting the SMS message to an SMS transmission server 330; and the SMS transmission server 330 adapted to obtain an IP address of a called party's Internet phone, and serving as an H.323 terminal registered in the gatekeeper 310 according to the feature of the present invention. Preferably, the H.323 system may be further provided with at least one gateway 340 connectable to a packet based network (PBN) and serving as an interface for linkage between the TCP/IP protocol and a telephone network.

The gatekeeper 310 serves to generally control the entire operation of the H.323 system according to the present invention, and carries out setup and management of an incoming/outgoing call, and any other additional services such as multi-party calling, call forwarding or various incoming call termination services available using the system, in particular, in association with a multipoint controller (MC) 312, the H.323 terminals 322 to 324, the SMS transmission server 330, and a gateway 340. The gateway 340 serves as an interface for association between the TCP/IP protocol and the telephone network, and the respective H.323 terminals 322 to 324 correspond to terminals for providing VoIP service on the basis of the TCP/IP protocol. The multipoint controller (MC) 312 that serves to control multi-party calling may be provided individually or integrally with other components in a single module. A multi-party control unit (MCU) 316, indicated by a dotted line in FIG. 3, serves to control the multi-party calling and to provide a mixing function. Although the MCU 316 enables users to have improved multi-party calling, it is hardly applied in the actual systems owing to its expensive price.

The H.323 compatible gatekeeper 310 carries out the various functions of registration, cancellation, modification and searching of a user, utilizing a registration admission and status (RAS) message that corresponds to a lower element of an H.225 protocol system performing the setup of a call, and the registration and cancellation of users. In other words, the gatekeeper 310 searches a user information database 314 when any message relating to the registration is inputted, and then notifies the user as to whether the requested message will be processed further with the system. Upon setup of a call, the gatekeeper searches the database 314 to determine whether the two users of the corresponding call have been ever registered therein, and allows setting up of the call for only registered users.

Hereinafter, the operation for transmission of SMS messages according to the embodiment of the present invention will be described in further detail with reference to the above-mentioned configuration of a network system. First of all, if the user enters a short message set together with a phone number of a desired called party into his own originating terminal (i.e., his Internet phone), and then depresses a specified button for transmission of the short message (that is, SMS message), the SMS transmission module of the corresponding terminal transmits this SMS message to a predetermined port of the SMS transmission server.

Figure 5:
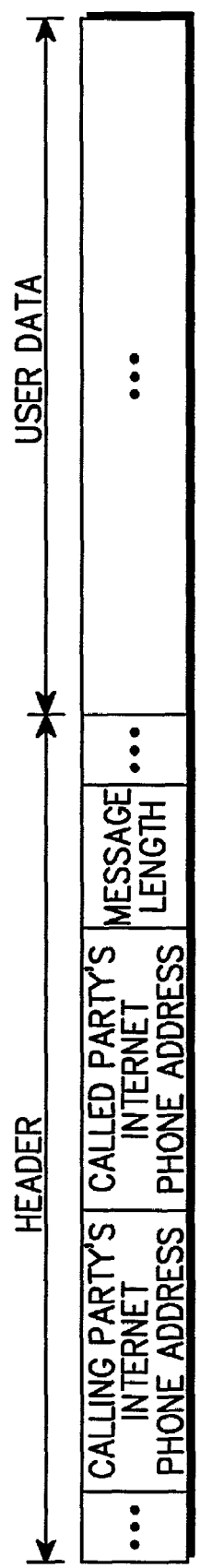
FIG. 5 is a schematic diagram showing a data format of the SMS data for the Internet phones according to a preferred embodiment of the present invention.

Referring to FIG. 5, the format of the SMS message generally consists of a header area and a user data area, wherein the header area includes an address (i.e., phone number) of the calling party's Internet phone, an address (i.e., phone number) of the called party's Internet phone, and a length of the message, while the user data area includes information relative to the inputted SMS message. In the meantime, the SMS transmission server 330 continues to monitor the predetermined port and, upon input of a new SMS message, obtains a tag of the corresponding SMS message, and obtains from the header other information, such as the address of the calling party's Internet phone, an address of the called party's Internet phone, and the length of the SMS message. Thus, it transmits an admission request (ARQ) message for registration admission and status (RAS) to the gatekeeper 310 with the telephone number of the called party and then, in return, receives an admission confirm (ACF) message to thereby obtain an IP address of the called party's Internet phone. Thereafter, a corresponding SMS message is transferred to the predetermined port of the obtained IP address.

Figure 4:
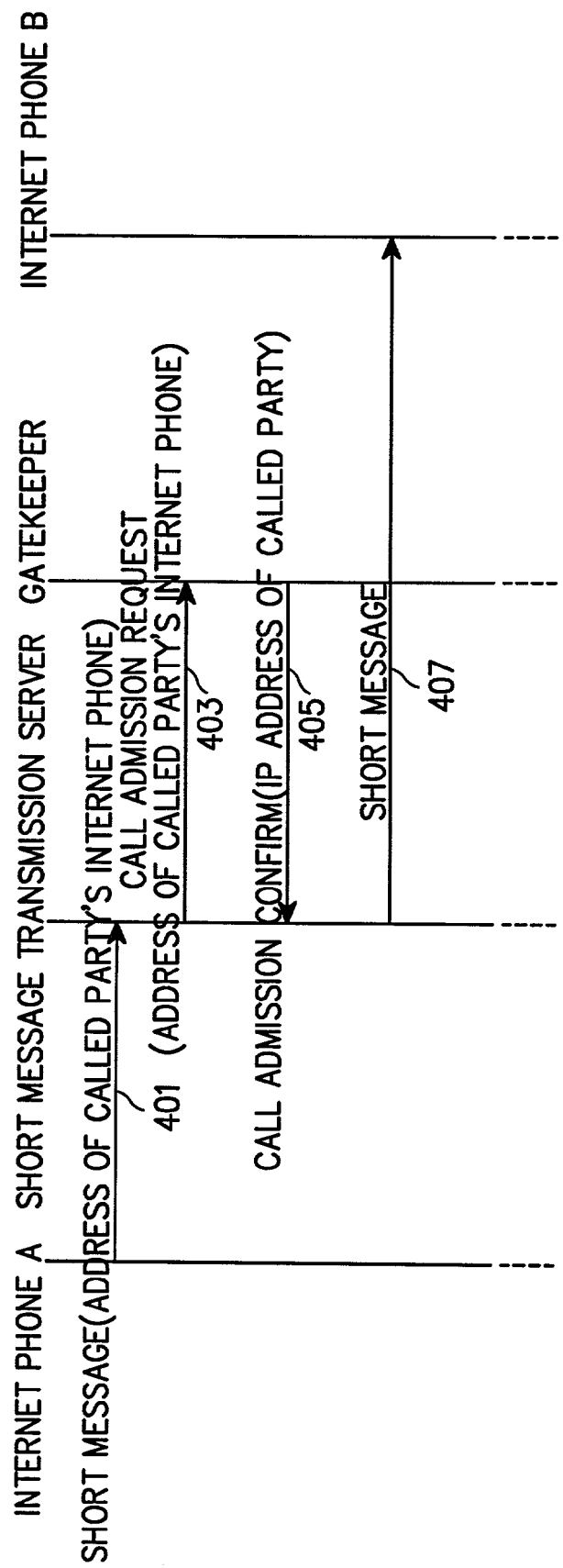
FIG. 4 is a flowchart of message confirmation for communication of the SMS data between is the Internet phones according to a preferred embodiment of the present invention.

Referring now to FIG. 4, which is a flow chart of the message confirmation procedure for communication of the SMS data between the Internet phones according to a preferred embodiment of the present invention, a more detailed description will be made relative to the SMS message transmission. In step 401, the Internet phone A of the calling party transmits a short message set to the SMS transmission server 330, wherein the corresponding short message includes the address (phone number) of the called party, i.e., Internet phone B. Then, the SMS transmission server 330 transmits, in step 403, a call admission request message to the gatekeeper 310 with the phone number of the Internet phone B received from the Internet phone A, wherein the SMS transmission server 330 functions as the H.323 terminal registered in the gatekeeper 310. In reply thereto, the gatekeeper 310 transmits a call admission confirm message to the SMS transmission server 330 in step 405 after the gatekeeper 310 searches the list of registered Internet phones for the IP address of the called party, i.e., Internet phone B, and then transmits the obtained address to the SMS transmission server 330. In step 407, the SMS transmission server 330 transmits the corresponding short message to the Internet phone B with the IP address. As a result, the method and system for SMS message transmission are realized using Internet phones according to the present invention.

As described in the foregoing, it is appreciated that the invention achieves the SMS communication function between the Internet phones by merely adding an SMS transmission server to the H.323 network system. Accordingly, the inventive method and system solve the problem of the prior art wherein the Internet phones are not provided with any protocol for communication of such a short message service via their own network connection, although they allow not only voice communication but also video telephone calling. The invention allows a user of an Internet phone to transmit the SMS message to the called party's Internet phone using the registration admission and status (RAS) protocol of the H.323 multimedia communication protocol.

Although a preferred embodiment of the present invention has been described, it will be understood by those skilled in the art that the present invention should not be limited to the described preferred embodiment. Rather, various changes and modifications can be made within the spirit and scope of the present invention, as defined by the following claims.

What is claimed is:

1. A system for transmitting a short message in an Internet phone, comprising:

a gatekeeper for controlling setup of a call and at least one of a user registration and a cancellation in the Internet phone, said Internet phone being optionally connected with said gatekeeper, said Internet phone having a short message transmission module for transmitting, via a predetermined port, the short message including information corresponding to a telephone number of an Internet phone of a called party; and a short message transmission server for receiving the short message transmitted by the short message transmission module, and serving as a terminal registered in the gatekeeper for transmitting, to the gatekeeper, the information corresponding to the telephone number of the Internet phone of the called party as included in the short message when the short message is transmitted via the predetermined port, so as to obtain an Internet protocol (IP) address of the Internet phone of the called party, and for transmitting the short message to the IP address of the Internet phone of the called party.

2. The system for transmitting a short message according to claim 1, wherein said short message transmission server transmits an admission request (ARQ) message for registration admission and status (RAS) protocol to the gatekeeper with the telephone number of the Internet phone of the called party included in the short message, and then receives an admission confirm (ACF) message to obtain therefrom the Internet protocol (IP) address of the Internet phone of the called party.

3. The system for transmitting a short message according to claim 2, wherein said short message includes a tag portion, the telephone number of the Internet phone of the calling party, the telephone number of the Internet phone of the called party, and information regarding a length of a main sentence of the short message.

4. The system for transmitting a short message according to claim 1, wherein said short message includes a tag portion, the telephone number of the Internet phone of the calling party, the telephone number of the Internet phone of the called party, and information regarding a length of a main sentence of the short message.

5. A method for transmitting a short message in an Internet phone of a calling party, comprising the steps of:
   providing a short message transmission server and a gatekeeper;
   providing the Internet phone of the calling party with a short message transmission module;
   transmitting the short message, including a telephone number of an Internet phone of the called party, from the short message transmission module of the Internet phone of the calling party to the short message transmission server;
   transmitting a call admission request message from the short message transmission server to the gatekeeper with the telephone number of the Internet phone of the called party included in the transmitted short message, and then receiving from the gatekeeper a call admission confirm message including an Internet protocol (IP) address of the Internet phone of the called party; and
   transmitting the short message from the short message transmission server to the Internet protocol (IP) address of the Internet phone of the called party.

6. The method for transmitting a short message according to claim 5, wherein both the Internet phone of the called party and the Internet phone of the calling party, and the short message transmission server, communicate with each other via a predetermined port.

7. The method for transmitting a short message according to claim 6, wherein said short message includes a tag portion, the telephone number of the Internet phone of the calling party, the telephone number of the Internet phone of the called party, and information regarding a length of a main sentence of the short message.

8. The method for transmitting a short message according to claim 5, wherein said short message includes a tag portion, the telephone number of the Internet phone of the calling party, the telephone number of the Internet phone of the called party, and information regarding a length of a main sentence of the short message.

9. A system for transmitting a short message in an Internet phone, comprising:
   a gatekeeper for controlling setup of a call; and
   a short message transmission server connected to said gatekeeper;
   said Internet phone transmitting, via a predetermined port to said short message transmission server, the short message including information corresponding to a telephone number of an Internet phone of a called party; and
   said short message transmission server transmitting, to the gatekeeper, the information corresponding to the telephone number of the Internet phone of the called party as included in the short message when the short message is transmitted via the predetermined port so as to obtain an Internet protocol (IP) address of the Internet phone of the called party, and for transmitting the short message to the IP address of the Internet phone of the called party;
   wherein said Internet phone includes a short message transmission module for transmitting the short message to the short message transmission server.

10. The system for transmitting a short message according to claim 9, wherein said short message transmission server transmits an admission request (ARQ) message for registration admission and status (RAS) protocol to the gatekeeper with the telephone number of the Internet phone of the called party included in the short message, and then receives an admission confirm (ACF) message to obtain therefrom the Internet protocol (IP) address of the Internet phone of the called party.

11. The system for transmitting a short message according to claim 10, wherein said short message includes a tag portion, the telephone number of the Internet phone of the calling party, the telephone number of the Internet phone of the called party, and information regarding a length of a main sentence of the short message.

12. The system for transmitting a short message according to claim 9, wherein said short message includes a tag portion, the telephone number of the Internet phone of the calling party, the telephone number of the internet phone of the called party, and information regarding a length of a main sentence of the short message.

13. The system for transmitting a short message according to claim 9, wherein said gatekeeper controls at least one of a user registration and a cancellation in the Internet phone.

14. The system for transmitting a short message according to claim 9, wherein said short message transmission server serves as a terminal registered in the gatekeeper.

* * * * *